United States Patent Office — 3,661,978, Patented May 9, 1972

3,661,978
PROCESS FOR ESTERIFICATION OF TERTIARY TERPENIC ALCOHOLS

Peter S. Gradeff, Somerset, and Bernard Finet, Princeton, N.J., assignors to Rhodia Inc., New York, N.Y.
No Drawing. Filed May 26, 1969, Ser. No. 827,940
Int. Cl. C07c 67/00
U.S. Cl. 260—486 R            17 Claims

ABSTRACT OF THE DISCLOSURE

Tertiary terpenic alcohols, and tertiary vinyl alcohols, such as linalool and homologues thereof, are esterified using the corresponding aliphatic acid anhydride as an acylating agent, and without the necessity of a catalyst or solvent. Linalool can be converted to linalyl acetate using acetic anhydride to give yields in excess of 95% theory.

---

Tertiary terpenic alcohols, such as linalool, are found in many naturally-occurring essential oils. A number of linalool homologues are described in the literature as, for instance, in U.S. Pat. No. 3,296,080 to W. C. Meuly and P. S. Gradeff, dated Jan. 3, 1967. Inasmuch as the esters of these alcohols are usually more fragrant than the alcohols, and therefore more desirable in the perfume industry, the art has investigated processes of esterifying these alcohols. Since they are tertiary alcohols with an ethylenic double bond on the carbons α and β to the tertiary carbon atom, their esterification presents difficulties characteristic of these alcohols. Certain nontertiary terpene alcohols, such as geraniol, can be acetylated readily with acetic acid anhydride or acetic acid, by simple heating, removing acid or water formed during the esterification, using toluene as the entrainer. However, tertiary terpenic alcohols such as linalool cannot be esterified in this way. One problem is that the free acid (used as the esterifying agent or formed as a by-product when the acid anhydride is used) prevents the esterification from going to a high level at moderate temperature, and more importantly causes side reactions, as for instance, dehydration and isomerization.

A number of procedures have been proposed in the prior art for accomplishing this esterification. In accordance with U.S. Pat. No. 2,423,545 to Aeschbach, dated July 8, 1947, linalool, for example, is esterified with acetic anhydride in the presence of sodium acetate as a catalyst to yield the linalyl acetate and acetic acid. The liberated acetic acid is removed azeotropically by distillation with an entrainer, such as toluene, which forms a binary azeotrope with the liberated acetic acid boiling lower than any of the other ingredients in the reaction mixture. This process has several disadvantages resulting from the use of two extraneous ingredients, namely, the catalyst and the solvent: The catalyst must be carefully and completely removed, and the solvent has to be recovered and purified. Notwithstanding proposals such as that described above, the reaction takes considerable time, and cannot be carried to high yields.

It has also been proposed to by-pass this difficult esterification in accordance with U.S. Pat. No. 2,797,235 to Birbiglia et al., dated June 25, 1967, by esterifying analogous trisubstituted carbinols such as the acetylenic analogue of linalool (dehydrolinalool) in the presence of an acid catalyst, and then hydrogenating the acetylenic triple bond to an ethylenic double bond. This procedure is alleged to give improved yields, since the acetylenic carbinols appear much more stable under the usual esterification conditions than the vinylic tertiary carbinols. This procedure, however, applies only to dehydrolinalools, and does not solve the problem for linalool or homologues, which are not necessarily made via the acetylenic intermediates.

In accordance with the invention, open chain and cyclic tertiary terpenic alcohols, and especially tertiary vinyl alcohols, such as linalool and homologues thereof, are esterified with an acid anhydride as the acylating agent, preferably in the absence of a catalyst, while distilling acid anhydride from the reaction mixture in sufficient amount to entrain and remove the liberated acid as it is formed, by distillation with the acid anhydride.

Preferably, acid anhydride is fed to the reaction mixture to maintain an esterifying quantity of anhydride in the reaction mixture, so as to continue the esterification. The acid anhydride has a higher boiling point than the acid, and therefore the distillation is at a temperature higher than the boiling point of the liberated acid. Under these conditions, particularly as a result of the fast and effective removal of the acid liberated by the reaction, side reactions involving the acid which would take place at the higher temperature are avoided. Since the acid is removed from the reaction mixture, and anhydride is present in excess, to serve as entrainer, high yields can be obtained. In accordance with this invention, when the tertiary vinyl alcohol is linalool and is esterified with acetic anhydride, yields in excess of 96% can be achieved, without a catalyst.

Since the reaction proceeds to the high degree of completion without a catalyst, a catalyst is unnecessary. In fact, any of the conventional acylation catalysts can be used in carrying out the process of the invention, but the presence of a catalyst does not appear to give any improvement in yield, or other advantage. Preferably, therefore, a catalyst is not used, although there is no reason to exclude the catalyst. Catalysts which can be used include alkali metal organic acid salts, such as sodium acetate potassium acetate, sodium formate, sodium propionate, sodium oxalate, sodium tartrate, phosphoric acid, p-toluene sulfonic acid, and zinc chloride.

The process of the invention is directed to tertiary terpenic alcohols, and especially to any tertiary vinyl alcohol in which the tertiary carbon has an α-vinyl group. The method can be successfully applied to the other tertiary alcohols known to be not readily susceptible to acetylation.

The tertiary vinyl alcohols which can be esterified in accordance with the invention have the following general formula:

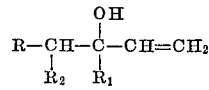

R is a long chain saturated or unsaturated aliphatic radical having from one to about ten carbon atoms.

$R_1$ is a saturated or unsaturated aliphatic radical having from one to about eight carbon atoms.

$R_2$ is hydrogen or a saturated or unsaturated aliphatic radical having from one to about eight carbon atoms.

$R_1$ and $R_2$ may be taken together to form a trimethylene or tetramethylene group, thus froming a cycloaliphatic ring to which the vinyl group is attached.

When R is a 3-methyl-2-butenyl radical, $R_1$ is a methyl radical, and $R_2$ is hydrogen, the alcohol is linalool.

Tertiary acetylenic alcohols whereby the vinyl group is replaced by an acetylenic C≡CH group such as dehydrolinalool or tertiary terpenic alcohol such as terpineol are other examples where the method can be advantageously applied.

The acid anhydride which is the only essential reaction starting material besides the tertiary vinyl or terpenic alcohol preferably is acetic anhydride, but it can be any volatile homo- or mixed anhydride of any lower molecular weight saturated or unsaturated aliphatic acid, and having from four to about ten carbon atoms of the type

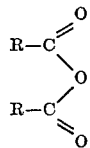

in which R has from one to about five carbon atoms. Exemplary are propionic anhydride, butyric anhydride, and isobutyric anhydride, valeric anhydride, isovaleric anhydride, etc.

The process of the invention should be carried out at such a temperature and pressure that the reaction mixture is boiling and distilling off the acid and acid anhydride.

The reaction vessel can be equipped with a column which serves to prevent the alcohol from being entrained with the acid and acid anhydride. Maintaining a proper reflux ratio is another way to achieve the same purpose. The acid-acid anhydride distillate during the reaction can be collected at total take-off or preferably at a reflux ratio of from 1:1 to 1:10. Although higher reflux ratios can be used, which will result in distilling mixtures richer in acid, results tend to be inferior. The column height and the reflux ratio should be no higher than necessary in order to keep the tertiary alcohol in the reaction vessel.

The distillate taken off during the reaction comprises acid and anhydride. The total amount of the distillate and the proportion of acid in it can vary depending on the column height, reflux ratio, and length of the reaction time. For instance, the amount of distillate during the reaction can be from about 100 to 1000 g. per mole of alcohol.

Under the preferred conditions for the reaction, no column, or a very small one, is used whereby a certain amount of alcohol and ester may distill off together with the acid-anhydride mixture. This distillate then is fractionated and the alcohol and anhydride returned to the reaction vessel while the acid can be discarded. The fractionation to remove alcohol and anhydride is preferably carried out at a lower temperature.

It is known that the rate of esterification increases with the temperature. For instance, only about 50% of the linalool reacts in seven hours reaction time at about 100° C. when boiling under appropriate vacuum, and 82% at 120° C., the yield based on reacted linalool in these instances being the same, i.e., 95–98%. The reaction temperature, therefore, can be as low as practical, for example 50° C., and as high as the boiling point of the mixture permits. The preferred range is between 100 and 130° C. Usually, the temperature does not exceed about 160° C. at the pressure used.

The reaction proceeds at atmospheric pressure. However, reduced pressures are preferably used in order to reduce the boiling temperature of the reaction mixture, but the pressure should not be so low as to reduce the boiling temperature below about 50° C. Thus, for acetic acid anhydride the pressure for a boiling temperature of 50° C. is 22 mm. Hg.

In carrying out the process of the invention it is essential that until the reaction has proceeded as far as it is practical to take it, there be enough unreacted acid anhydride present in the reaction mixture in excess of stoichiometric amount to serve as an entrainer for the acid that is formed as a by-product. This can be accomplished by starting out the reaction with a mixture in which there is a molal excess of the acid anhydride in relation to the tertiary alcohol, preferably a molar ratio of tertiary alcohol reactant to acid anhydride from about 1:2 to about 1:6. Alternatively, the reaction can be started with at least equal molal amounts of the tertiary alcohol reactant and the acid anhydride, and additional acid anhydride fed batchwise or continuously during the reaction to replace that lost as entrainer, so as to maintain at least an esterifying amount, and preferably an excess, in the reaction mixture. In addition, a molar excess of the acid anhydride can be present in the starting mixture, and this excess maintained by adding the acid anhydride during the reaction to replace that which is removed as entrainer by distillation.

After the reaction has proceeded as far as it is practical to take it, the unreacted acid anhydride is fractionated off, preferably under moderate vacuum. The unreacted alcohol and the alcohol ester are then fractionated, under a higher vacuum.

The process of the invention produces a product of high purity with a minimum of contaminants to separate. Catalyst and a foreign entrainer are not needed, and not present, normally. Therefore, it is particularly suited for a continuous commercial operation, where anhydride and alcohol are continuously fed to the reaction system.

The process of the invention is particularly suited for continuous operation in a commercial plant on a large scale. The reactants can be continuously fed to a fractionating tower, which is maintained under reflux to continuously distill off acid and acid anhydride, and optionally, alcohol as well, while the reaction product is bled off at the bottom of the column. The distilled acid anhydride and any alcohol are separated from the acid, and recycled as feed, after fortifying with fresh acid anhydride to replace that removed in the ester. Thus, a continuous process is obtained in which the only materials consumed, apart from losses, are acid anhydride and alcohol, and no foreign substances such as catalyst or organic solvent entrainers are ever present. The process is thus efficient, and relatively inexpensive to operate as compared to prior catalytic and/or azeotropic processes.

The invention is particularly applicable to the preparation of linalyl acetate from linalool, using acetic anhydride as the acetylating agent. Since linalool is a relatively plentiful starting material, and is difficult to esterify in good yields by prior art procedures, linalool and acetic anhydride are used in the following illustrative Examples (1 to 6) but other tertiary vinyl or terpenic alcohols, and other acid anhydrides, can be employed, as seen in Examples 7 to 9.

In the examples, the conversion (expressed as a percentage) is defined as the amount of tertiary alcohol reacted (the amount employed as the starting material less the amount of the unreacted alcohol recovered) divided by the amount of the alcohol employed as the starting material, times 100. Thus, if 100 mols of linalool is used as the starting material, and 20 mols are recovered unreacted, the conversion is 80%. The yield is defined as the percentage of the tertiary alcohol reacted which was converted to the ester. For example, if out of 100 mols of the starting alcohol, 50 mols reacted and 45 mols of the acetate were recovered, the yield is 90%.

EXAMPLE 1

A one-liter reaction flask was equipped with 400 mm. column, having a diameter of 5½ cm. fitted with 6 x 6 mm. Raschig rings and an automatic reflux head. One mol of linalool (153.7 g.) and 4.0 mols of acetic anhydride (408.5 g.) were charged and heated to 120° C. under agitation. The reaction mixture was brought to boiling at 120° C. by applying a vacuum of about 300 mm. Hg. With a reflux ratio of 1:1, continuous distillation was maintained for 5½ hours, whereby a total of 500 cc. distillate was collected. During this time, 500 cc. of fresh acetic anhydride was added to the reaction flask through a dropping funnel at a rate approximating the distillation rate. At the end of the 5½ hours, the reaction was as complete as it was practical to carry it. The vacuum was adjusted to about 50 mm. and the excess of acetic anhydride distilled at low temperature (60–70° C.). Finally, the unreacted linalool and linalyl acetate were distilled at 0.5 mm. vacuum. The amount of unreacted linalool recovered was 27.7 g. 155 g. of pure linalyl acetate was recovered. The conversion was 82%, and the yield was 96.5%.

EXAMPLE 2

Employing the same equipment as described in Example 1, two mols of linalool and two mols of acetic anhydride were charged and heated to 120° C. under agitation. The reaction mixture was brought to boiling by applying a slight vacuum and maintained at 120° C. With a reflux ratio of 1:1, continuous distillation was maintained for 5½ hours, during which time a total of 975 g. distillate was collected. During this time 975 g. of fresh acetic anhydride was added to the reaction flask through a dropping funnel, at a rate similar to the distillation. The excess of acetic anhydride was distilled, and finally the unreacted linalool and linalyl acetate were distilled, as described in Example 1. The amount of unreacted recovered linalool was 31.8% of the starting material, giving a conversion of 68.2%. 242 g. pure linalyl acetate was obtained, which corresponds to a yield of 91%. This example, when compared with Example 1, shows that a higher yield and conversion can be obtained with a higher ratio of anhydride to alcohol in the starting mixture. This example shows conversion and yield are lower, when the excess of acetic anhydride is lower in the starting mixture.

EXAMPLE 3

A reaction flask was equipped with a 470 mm. Vigreux column. One mol of linalool (153.7 g.) and 4.0 mols of acetic anhydride (508.5 g.) were charged. The reaction mixture was heated and brought to boiling at 105° C. by applying the necessary vacuum. Distillation was maintained for nine hours, during which a total of 930 g. distillate was collected. This same amount of acetic anhydride were replaced in the reaction mixture as described in the preceding example. The distillate was found to contain 14.6 g. of linalool. Following the procedure in Example 1, 63.3 g. of linalool was found with the acetate, which was 95.16 g., giving a conversion of 49.5% and a yield of 98.5%. This example demonstrates that the conversion is lower at the lower temperatures, even when the reaction time is longer.

EXAMPLE 4

Employing the same apparatus as in Example 3, one mol of linalool and 4.0 mols of acetic anhydride were charged and heated at 125° C. at about 350 mm. Hg for seven hours, during which time a total of 940 g. distillate was collected. During this time, the same amount of fresh acetic anhydride was added to the reaction, as described previously. The product was worked up in the manner described in the previous examples. The amount of unreacted recovered linalool was 16.5%, or a conversion of 83.5%, and the yield was 95.5%.

EXAMPLE 5

(a) Example 4 was repeated, except that in addition 3.0 g. of potassium acetate was added to the reaction mixture, which was heated to 120° C. under agitation for 4½ hours, with the removal of 687 g. distillate. During this time, the same amount of fresh acetic anhydride was added to the reaction. After cooling the reaction mixture, the catalyst was separated by filtration, and the filtrate washed to remove any traces of catalyst therefrom. The washed filtrate was distilled as described previously. The conversion was 68.8% and the yield 94%. This example shows that the addition of a catalyst does not improve yield or conversion, but that the catalyst is not deleterious if the reaction is carried under the described reaction conditions.

(b) One mole of linalool, two moles of acetic anhydride, 3.0 g. of potassium acetate and 300 cc. of toluene were heated to boiling (120–123° C.) during 4½ hours. A total of 431 g. of distillate, mostly toluene and acetic acid with some acetic anhydride, was taken out rapidly, with minimum reflux. Fresh toluene (475 cc.) and acetic anhydride (53 g.) were added into the reaction flask during the reaction. After cooling, filtering the catalyst and washing it with toluene, the solvent was recovered; then the acid anhydride and the product were distilled. The yield was 95% with 28% unreacted linalool.

This shows that toluene as an entrainer plus a catalyst is not capable of giving any better yield than the process of the invention, and in addition both toluene and catalyst have to be separated at the end.

(c) Example 5(a) was repeated, taken off 477 g. distillate through 700 mm. column fitted with 6 x 6 mm. Rashig rings, and using a reflux ratio of 1:10. After work-up similar to Example 5(a), the yield was found to be only 76.5%. This example shows the importance of the appropriate combination of column height and reflux ratio for a particular reaction condition.

EXAMPLE 6

A reaction flask was equipped with 700 mm. column fitted with 8 x 8 mm. Raschig rings and an automatic reflux head set to operate at a 1:10 reflux ratio. One mol of linalool and 4.0 mols of acetic anhydride were charged and heated and maintained under boiling at 120 C. by applying the appropriate vacuum (300–380 mm. Hg) for six hours, during which time a total of 102 g. of distillate was collected. During this time, 100 g. of fresh acetic anhydride was added to the reaction flask at a rate similar to the distillation. The product was worked up after six hours reaction, as described previously. The unreacted linalool was 11.5%, to a conversion of 88.5%, and the yield was 93%. This example shows that in absence of a catalyst, the conditions can be more flexible; hence working in absence of a catalyst is preferable.

EXAMPLE 7

3-methyl-1-nonen-3-yl acetate was prepared as follows:

A one-liter reaction flask was equipped with a 400 mm. column, having a diameter of 5½ cm. filled with 6 x 6 mm. Raschig rings and an automatic reflux head. One mol of 3-methyl-1-nonen-3--ol (155.5 g.) and about 4.0 mols of acetic anhydride (406.9 g.) were charged and heated to 122° C. under agitation. The reaction mixture was brought to boiling at 122° C. by applying a vacuum. With a reflux ratio of 1:1, continuous distillation was maintained for seven hours, whereby a total of 566 g. distillate was collected. During this time 547 g. acetic anhydride was added to the reaction flask through a dropping funnel at a rate approximating the distillation rate.

At the end of seven hours, the vacuum was adjusted to about 50 mm. and the excess of acetic anhydride distilled. The unreacted 3 - methyl-1-nonen-3-ol and 3-methyl-1-nonen-3-yl acetate were distilled at 0.4 mm. vacuum. The amount of unreacted 3-methyl-1-nonen-3-ol recovered was 14.9 g. 154.55 g. of pure 3-methyl-1-nonen-3-yl acetate was recovered. The yield was 86.4%.

EXAMPLE 8

Linalyl isobutyrate was prepared as follows:

A one-liter reaction flask was equipped with a 700 mm. column, having a diameter of 5½ cm. filled with 6 x 6 mm. Raschig rings and an automatic reflux head. One mole of linalool (154 g.) and 4.0 mols of isobutyric anhydride (638.9 g.) were charged and heated at 123–126° C. under vacuum for four hours and thirty-five minutes, during which time 470.8 g. distillate was collected. During this time, 302.2 g. isobutyric anhydride was added to the reaction flask through a dropping funnel.

The reaction mass was fractionated whereby 11.6 g. of unreacted linalool and 186.25 g. of pure linalyl isobutyrate were recovered. The yield was 90.5%.

EXAMPLE 9

Linalyl propionate was prepared as follows:

Employing the same equipment as described in Example 7, one mol of linalool (154.3 g.) and 4.0 mols of propionic anhydride (539.3 g.) were charged and heated at 125° C. at 150–200 mm. Hg for seven hours, during which time 387 g. distillate was collected. During this time, 467 g. propionic anhydride was added to the reaction flask through a dropping funnel. At the end of seven hours, the reaction mass was fractionated whereby 178.7 g. pure linalyl propionate and 6.4 g. unreacted linalool were recovered. The yield was 88.7%.

Having regard to the foregoing disclosure, the following is claimed as the inventive and patentable embodiments thereof:

1. A process for the esterification of tertiary terpenic alcohols, which comprises reacting a tertiary terpenic alcohol having the formula

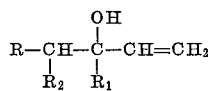

where R is selected from the group consisting of aliphatic radicals having from one to about ten carbon atoms; $R_1$ is selected from the group consisting of aliphatic radicals having from one to about eight carbon atoms, and $R_1$ linked to $R_2$; $R_2$ is selected from the group consisting of hydrogen, aliphatic radicals having from one to about eight carbon atoms, and $R_2$ linked to $R_1$; and $R_1$ and $R_2$ linked together are selected from the group consisting of trimethylene or tetramethylene forming a cycloaliphatic ring, with an excess of a volatile organic aliphatic acid anhydride of an aliphatic organic carboxylic acid, said anhydride having from four to about ten carbon atoms at a temperature at which the anhydride and acid of the anhydride distill off together from the reaction mixture, while distilling acid anhydride from the reaction mixture in sufficient amount to entrain and remove the acid of the anhydride formed as a by-product to minimize side reactions and losses of tertiary alcohol and tertiary alcohol ester.

2. A process according to claim 1, in which acid anhydride is fed to the reaction mixture to maintain a sufficient quantity of acid anhydride in the reaction mixture to continue the esterification.

3. A process according to claim 1, in which substantially all of the acid liberated by the reaction is effectively removed, and the reaction is driven essentially to at least 85% completion.

4. A process according to claim 1 in which the reaction temperature is within the range from about 70 to about 160° C.

5. A process according to claim 1, in which an esterification catalyst is added, selected from alkali metal salts of carboxylic acids, phosphoric acid, p-toluene sulfonic acid, and zinc chloride.

6. A process according to claim 1 in which the reaction mixture is substantially free from catalyst.

7. A process according to claim 1, in which the reaction mixture consists essentially of only tertiary terpenic alcohol and volatile acid anhydride reactants, acid of the anhydride formed as a by-product, and tertiary alcohol ester.

8. A process according to claim 1, in which R is a saturated or unsaturated aliphatic radical having from one to about ten carbon atoms, $R_1$ is a saturated or unsaturated aliphatic radical having from one to about eight carbon atoms, and $R_2$ is hydrogen or a saturated or unsaturated aliphatic radical having from one to about eight carbon atoms.

9. A process according to claim 1 in which the tertiary terpenic alcohol is linalool.

10. A process according to claim 1 in which anhydride is distilled continuously and fed to the reaction mixture continuously at approximately the same rate.

11. A process according to claim 10 in which acid is separated from the anhydride distilled and the anhydride then recycled to the reaction mixture.

12. A process according to claim 1 in which the reaction is carried out at a pressure from about 20 mm. Hg up to atmospheric pressure.

13. A process according to claim 1 in which the reaction is carried out at the boiling temperature of the reaction mixture and the acid-anhydride distilled off.

14. A process according to claim 13 in which the reflux ratio is from about 1:1 to about 1:10.

15. A process according to claim 1 in which the alcohol is retained in the reaction mixture by fractionation.

16. A process according to claim 1 in which alcohol is distilled off with the acid and anhydride, the distillate is fractionated to separate the acid, and alcohol and anhydride are returned to the reaction mixture.

17. A process according to claim 1 in which the molar ratio of alcohol:acid anhydride is within the range from 1:1 to about 1:6.

References Cited

UNITED STATES PATENTS

| | | | |
|---|---|---|---|
| 2,232,433 | 2/1941 | Borglin | 260—489 |
| 2,232,434 | 2/1941 | Borglin | 260—489 |
| 2,423,545 | 7/1947 | Aeschbach | 260—489 |

JAMES A. PATTEN, Primary Examiner

V. GARNER, Assistant Examiner

U.S. Cl. X.R.

260—489

PO-1050
(5/69)

UNITED STATES PATENT OFFICE
CERTIFICATE OF CORRECTION

Patent No. 3,661,978            Dated May 9, 1972

Inventor(s) Gradeff et al.

It is certified that error appears in the above-identified patent and that said Letters Patent are hereby corrected as shown below:

| | | |
|---|---|---|
| Column 1, line 64 | : | After "gous" insert -- acetylenic -- |
| Column 2, line 36 | : | Insert comma (,) after first "acetate" |
| Column 2, line 61 | : | "froming" should be -- forming -- |
| Column 4, line 4 | : | "molar" should be -- molal -- |
| Column 5, line 31, Example 3 | : | "(508.5 g.)" should be -- (408.5 g.) -- |
| *Column 6, line 15, Example 5 | : | "Rashig" should be -- Raschig -- |
| Column 6, line 27, Example 6 | : | Add degree (°) after "120" |

Signed and sealed this 24th day of April 1973.

(SEAL)
Attest:

EDWARD M. FLETCHER, JR.
Attesting Officer

ROBERT GOTTSCHALK
Commissioner of Patents